July 7, 1931.  W. V. PAINE  1,813,896
FILTER FOR DUST COLLECTORS
Filed Dec. 19, 1928
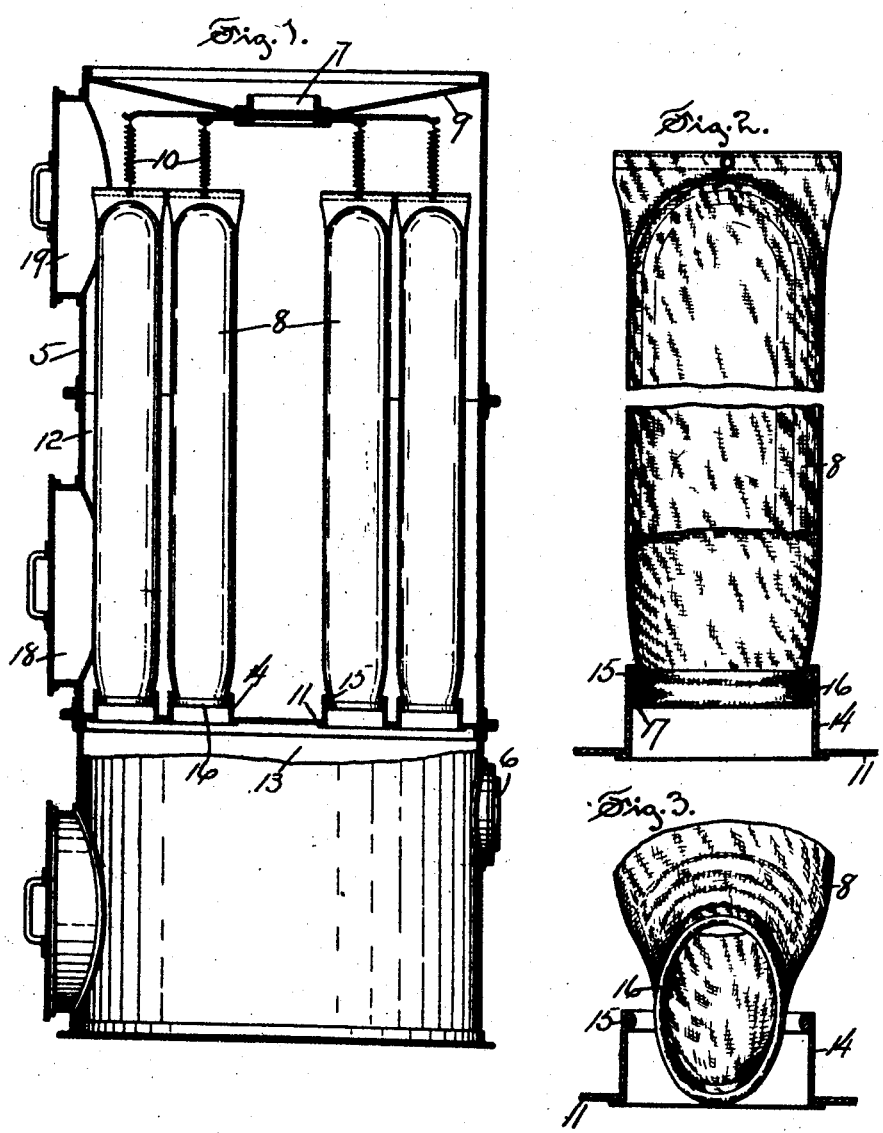
INVENTOR
Wilbur V. Paine,
by
Arthur B. Jenkins,
ATTORNEY Patented July 7, 1931

1,813,896

UNITED STATES PATENT OFFICE

WILBUR V. PAINE, OF EAST HARTFORD, CONNECTICUT, ASSIGNOR TO THE SPENCER TURBINE COMPANY, OF HARTFORD, CONNECTICUT, A CORPORATION OF CONNECTICUT

FILTER FOR DUST COLLECTORS

REISSUED

Application filed December 19, 1928. Serial No. 327,067.

My invention relates more particularly to that class of devices that are employed for separating dust and other foreign material from air to purify the latter, and an object of my invention, among others, is to provide a filter so constructed that the filtering elements may be readily installed or removed from a case in which they are usually located.

One form of a device embodying my invention and in the construction and use of which the objects herein set out, as well as others, may be attained, is illustrated in the accompanying drawings in which—

Figure 1 is a view, partially in vertical central section, of a dust collector embodying filters equipped with my improved fastening device.

Figure 2 is a view, scale enlarged, in section through the lower end of a filter and through the parts to which this lower end is secured.

Figure 3 is a view of the lower end of the filter showing the means for engaging it with or disengaging it from its holder.

My improved filter, while not limited in its use to any designated apparatus, is particularly efficient for the purpose of cleansing air from dust and dirt or other foreign matter, and in connection with vacuum cleaning structures especially. I have, therefore, illustrated herein my improved filter as applied to a vacuum cleaning apparatus which may be of any old and well known construction.

In the drawings the numeral 5 denotes a filter case having an inlet 6 and an outlet 7 through which air is induced to flow as by means of a pump in a manner that will be readily understood by those skilled in the art. A number of filters 8 are suspended within the case as from a support 9, these filters being preferably in the form of bags or tubes open at their lower ends and closed at their opposite ends. They are composed of fabric quite closely woven so that practically nothing but air will pass through the meshes. The filters are suspended as from springs 10 secured to the ends of the tubes or filters and to the support 9, as shown in Figure 1 of the drawings. A plate 11 extends across the case near its lower end dividing it into a filter chamber 12 in which the filters are located and a collector chamber 13 in which the heavier particles of matter are retained. All of the parts thus far described are of old and well-known construction, and, except in connection with the device now to be described, form no part of my present invention.

My invention has particularly to do with the means for securing the lower ends of the bags or filters in place so that they may properly receive the currents of dust-laden air flowing into the mouths of the filters at their lower ends. It is necessary that the filters shall be removed from time to time for the purpose of cleansing them from the fine particles of dust with which they become impregnated. Considerable difficulty has been encountered in prior apparatus in removing these filters, but I have overcome this difficulty by providing a ready means whereby the filtering elements may be readily loosened and removed and may be as readily secured in place after they have been cleansed. In carrying out my idea a number of collars 14 are secured in holes in the plate 11, projecting upwardly within the filter chamber 12. These collars are each provided with a holder 15 that is in the form of a ring firmly secured to the inner surface of the collar at or near the upper edge thereof, and that thereby forms a shoulder. A pocket 16 is formed in the lower edge of each filter as by turning the edge backwardly and sewing it in a manner that will be readily understood. A retainer 17 is located in this pocket, this retainer being preferably of flexible material that will enable it to be slightly distorted so that it may be removed through the opening in the holder 15. Preferably a piece of metal having spring qualities is employed in each pocket, this being of a size substantially larger than that of the opening through the holder 15. The springs 10 draw the filters upwardly so that the enlarged end of each filter produced by the retainer 17 will rest against a holder 15, thus preserving the filters in proper position to receive the currents of dust-laden air.

When it is desired to remove the filters, access to the lower ends thereof may be had as through an opening 18 in the side wall of the case 5 near the bottom end thereof. The spring rings comprising the retainers may be distorted sufficiently to enable them to be readily drawn upwardly through the openings in the holders 15, thus loosening the lower ends of the filters, and enabling them to be readily detached. The filters may then be removed as through an opening 19 through the wall of the case at the upper end of the filter chamber and after such filters have been disengaged from the springs 10. In a similar manner the filters may be replaced, and after attachment to the springs 10, the lower ends may be thrust through the openings in the collars 14. The spring rings will maintain the proper form of the ends of the filters to cause them to engage the holders 15 and thereby secure the lower ends of the filters in place.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. A dust collector including a support, a collar, a holder comprising a ring mounted within the collar, a filter tube suspended from said support and open at its lower end and adapted to project through said ring, and a retainer attached to the lower end of said tube and constructed to be passed through said ring and thereafter to engage the latter to retain the lower end of said tube in place.

2. A dust collector including a support, an apertured holder, a filter tube yieldingly suspended from said support and open at its lower end and adapted to project through said holder, and a flexible retainer attached to the lower end of said tube to yieldably engage under the edge of said holder to retain the lower end of said tube in place.

3. A dust collector including a support, a collar, a holder comprising a ring mounted within the collar, a filter tube suspended from said support and open at its lower end and adapted to project through said ring, and a retainer comprising a loop of yielding material attached to the lower end of said tube and of a size to be passed through said ring and thereafter to engage the under side of said ring to retain the lower end of said tube in place.

4. A dust collector including a support, a collar, a holder comprising a shoulder in the bore of the collar, a filter tube suspended from said support and open at its lower end and adapted to project through said collar, said tube having a pocket in its lower end, and a retainer composed of yielding material in the form of a hoop located in said pocket and of a size to be passed through said collar and to engage the opposite side of the shoulder and to retain the lower end of the tube in place.

5. A dust collector including a support, a holder comprising a member having an opening therethrough, a filter tube yieldingly suspended from said support and open at its lower end and adapted to project through said opening, a pocket formed in the open end of said tube, and a hoop of spring metal of continuous length secured in said pocket and adapted to be distorted for passage through said opening to the opposite side thereof and to engage the edge of said opening when sprung to normal shape to retain the end of the tube in place.

WILBUR V. PAINE.